United States Patent
Wu et al.

(10) Patent No.: US 8,804,714 B2
(45) Date of Patent: Aug. 12, 2014

(54) RECOVERY OF MEDIA GATEWAY RESOURCES FOR TERMINATIONS

(75) Inventors: Jacky Wu, Shanghai (CN); Oliver Speks, Eschweiler (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 409 days.

(21) Appl. No.: 13/060,923

(22) PCT Filed: Aug. 28, 2008

(86) PCT No.: PCT/CN2008/001540
§ 371 (c)(1),
(2), (4) Date: Mar. 15, 2011

(87) PCT Pub. No.: WO2010/022542
PCT Pub. Date: Mar. 4, 2010

(65) Prior Publication Data
US 2011/0310728 A1    Dec. 22, 2011

(51) Int. Cl.
*H04L 12/56*    (2006.01)
(52) U.S. Cl.
USPC .......................................... 370/389; 370/401
(58) Field of Classification Search
None
See application file for complete search history.

(56) References Cited

U.S. PATENT DOCUMENTS

| 2003/0166402 | A1 | 9/2003 | Svensson et al. |
| 2008/0165947 | A1* | 7/2008 | Wang et al. ................... 379/229 |
| 2009/0109987 | A1* | 4/2009 | Kampmann et al. .......... 370/401 |
| 2011/0149742 | A1* | 6/2011 | Joensuu et al. ............... 370/241 |

FOREIGN PATENT DOCUMENTS

| CN | 1290459 A | 4/2001 |
| CN | 1524389 A | 8/2004 |
| EP | 1480412 A1 | 11/2004 |
| JP | 1968168 A | 5/2007 |
| WO | 2004071036 A1 | 8/2004 |

OTHER PUBLICATIONS

Groves, C. et al. "The Megaco/H.248 Gateway Control Protocol, version 2." Media Gateway Control (megaco), Internet Draft, Document: draft-ietf-megaco-h248v2-04.txt, Apr. 2003.

* cited by examiner

*Primary Examiner* — Marcus R Smith
(74) *Attorney, Agent, or Firm* — Coats & Bennett, PLLC

(57) ABSTRACT

The invention relates to a method for controlling a media gateway by a switching center having a cluster structure with a plurality of blades using a partial wildcarding mechanism by including a blade identifier in the wildcard field.

19 Claims, 6 Drawing Sheets

RECOVERY OF MEDIA GATEWAY RESOURCES FOR TERMINATIONS

TECHNICAL FIELD

This invention relates to a method for controlling a media gateway by a switching center server and to a media gateway controller controlling a media gateway.

BACKGROUND

The industry trend goes towards high capacity MSC servers which are also scalable. A typical architecture for such a system is a blade cluster structure with a plurality of blades. Transmission lines that carry payload are terminated in media gateways and the switching of these resources is controlled by the MSC server. Gateways act as translation units to enable communication between disparate networks. By way of example, a gateway can connect telephone networks of one or more operators and it can connect asynchronous transfer mode networks (ATM networks) to IP networks or TDM networks.

A termination of a media gateway is a logical entity which is the source and/or the sink of media and/or control streams. Each termination has a unique identity, the termination ID.

A context is an association between a number of terminations. The context describes the topology (who hears/sees whom) and the media mixing and/or switching parameters if more than two terminations are involved in the association. A termination shall exist in only one context at a time. A context is created by adding the first termination (with ADD command or MOVE command) and it is released by removing/subtracting the last termination (with SUBTRACT command or MOVE command).

Ephemeral terminations are better suited to a multi-blade architecture. The seizure of terminations is coordinated by the media gateway. There is no need for inter blade coordination on the MSC server side.

A change of the number of blades has no impact on the configuration of the other nodes. By way of example, additional processing capacity can be gained by installing new blades without operational intervention in other nodes. This basically requires a control association between the MSC blade cluster and the media gateway and makes multiple virtual media gateway configurations in a physical media gateway obsolete.

H.248 (or IETF name Megaco, Media Gateway Control Protocol) is for control of elements in a multimedia gateway and is used as a control protocol between the media gateway and the media gateway controller that may be provided in a mobile switching center.

A wildcard mechanism is known using two types of wildcards with termination IDs. These two wildcards are "ALL" and "CHOOSE". The former "ALL" is used to address multiple terminations at once while the latter "CHOOSE" is used to indicate to a media gateway that it should select a termination satisfying a partially specified termination ID. This allows for instance that a media gateway controller instructs a media gateway to choose an ephemeral termination.

In case of a blade failure and in order to allow an efficient use of resources a termination controlled by a failed blade needs to be recovered in an efficient way.

Recovery of ephemeral terminations can be done by connecting a different virtual media gateway to each blade, with different control associations. In case of outage of a blade all terminations linked to the control association are recovered. Another way to recover ephemeral terminations in a media gateway after outage of a blade with loss of calls controlled by that blade is to rely on mechanisms defined in ITU-T H.248.36 "Hanging termination detection package". This package offers a possibility for a media gateway to notify the server for any termination lasting longer than a predefined timer. The timer value is much longer than the mean holding time, where 90 s is a typical value.

In case of a TDM (time division multiplex) termination, the recovery has to be done one by one. TDM terminations are required to be accessible by all blades, otherwise, pre-partition of TDM termination can limit the efficiency of TDM termination resources at single blade outage and may violate certain ISUP/TUP standards which require certain patterns to assign TDM terminations to avoid collision. The result is that the TDM termination to be subtracted is not in a continuous range of termination ID or any fixed pattern and a wildcard mechanism would not be possible.

In the case of a configuration using virtual media gateways, it's possible to recover all terminations linked with the control association, but the possibility to share TDM terminations between different blades does not exist.

The mechanism to recover terminations after outage of a blade with loss of calls controlled by that blade such as the "hanging termination solution" has the drawback that long recovery time is required and that a large amount of messages needs to be exchanged between the MSC server and the media gateway.

SUMMARY

As a consequence, it is an object of the present invention to allow a fast recovery of terminations with a minimum number of messages to be exchanged.

This object is achieved by the features of the independent claims. In the dependent claims, preferred embodiments of the invention are described.

According to a first aspect of the invention, a method for controlling a media gateway is provided in which a switching center having a blade cluster structure with a plurality of blades controls the media gateway. According to a step of the method of the present invention, a message is transmitted to the media gateway including wildcard information, the wildcard information containing a blade identifier and a remaining wildcard field. By introducing a blade identifier into the wildcard information resulting in a blade identifier and a remaining wildcard field, the contexts or terminations used by a failed blade can be identified easily. According to the invention, the wildcard field provided for the wildcarding mechanism now includes a blade identifier and in case of a failing blade, the terminations and contexts controlled by a failed blade can be identified easily. Thus, a fast recovery of terminations of the blade failure is possible and the recovery can be finished with only two messages when failure of a blade is known by the system. At the same time a single node view of the cluster is provided to the network.

According to one embodiment of the invention, the blade identifier may be contained in bits with a predefined position of the identification information. By way of example, the blade identifier may be contained in the leading bits of the wildcard information. In this context, leading bits exclude the termination type bits contained in the termination ID. However, it is possible to place the blade identifier at any other position within the identification information.

In one embodiment of the invention, the message is a context generating message including a context identifier, the context identifier containing the blade identifier and the remaining wildcard field. In case a context is created, the blade identification contained in the context generating message as a part of the context identifier allows to identify all terminations involved in a certain context. When a context was generated including a context identifier, a message such as a termination subtracting message applicable to all contexts matching a context identifier can be used, the context identifier including the blade identifier and the remaining wildcard field. The solution is to allow a partial wildcard for the context ID when context is created in the media gateway and to use the wildcard context ID for subtracting the terminations in case of a blade failure. Thus, according to one embodiment of the invention, when a failure of a blade of the blade cluster is detected, a termination subtracting message can be sent to the media gateway for subtracting the terminations of all contexts controlled by the failed blade wherein the contexts controlled by the failed blade are identified using the blade identifier contained in the termination subtracting message. This helps to inform the media gateways which terminations should be subtracted by identifying all contexts having the transmitted context identifier.

Another embodiment of the message is a termination addition message including a termination identifier, the termination identifier containing the blade identifier and the remaining wildcard field. In case a termination has been added including the blade identifier, a termination subtracting message can be used including the termination identifier, the termination identifier containing the blade identifier. This allows a fast recovery of ephemeral terminations after a blade failure. This embodiment pre-partitions ephemeral termination name space to different blades and create an interworking pattern to arrive at a fast recovery. In this embodiment, a partial wildcard of the termination ID is used to group the ephemeral terminations controlled by a blade. Preferably, in case a failure of a blade of the blade cluster is detected, the termination subtract message is sent to the media gateway for subtracting the terminations controlled by the failed blade wherein the terminations controlled by the failed blade are identified and subtracted using the blade identifier contained in the termination subtract message.

Preferably, the blade identifier identifies the blade of the blade cluster that is controlling a communication path to which the message relates to.

According to another aspect of the invention, the latter relates to a media gateway controller controlling a media gateway, the controller generating the message for the media gateway including the wildcard information, the wildcard information containing the blade identifier identifying the blade of the switching center server with the blade cluster structure. The media gateway controller preferably functions as described above by generating context generating messages and termination subtracting messages for all contexts that were generated with the context generating message. In another embodiment, the controller generates termination creating messages and termination subtracting messages including the blade identifier.

BRIEF DESCRIPTION OF THE DRAWINGS

In the following, the invention will be described in further detail with reference to the accompanying drawings, in which.

DETAILED DESCRIPTION

Figure 1:
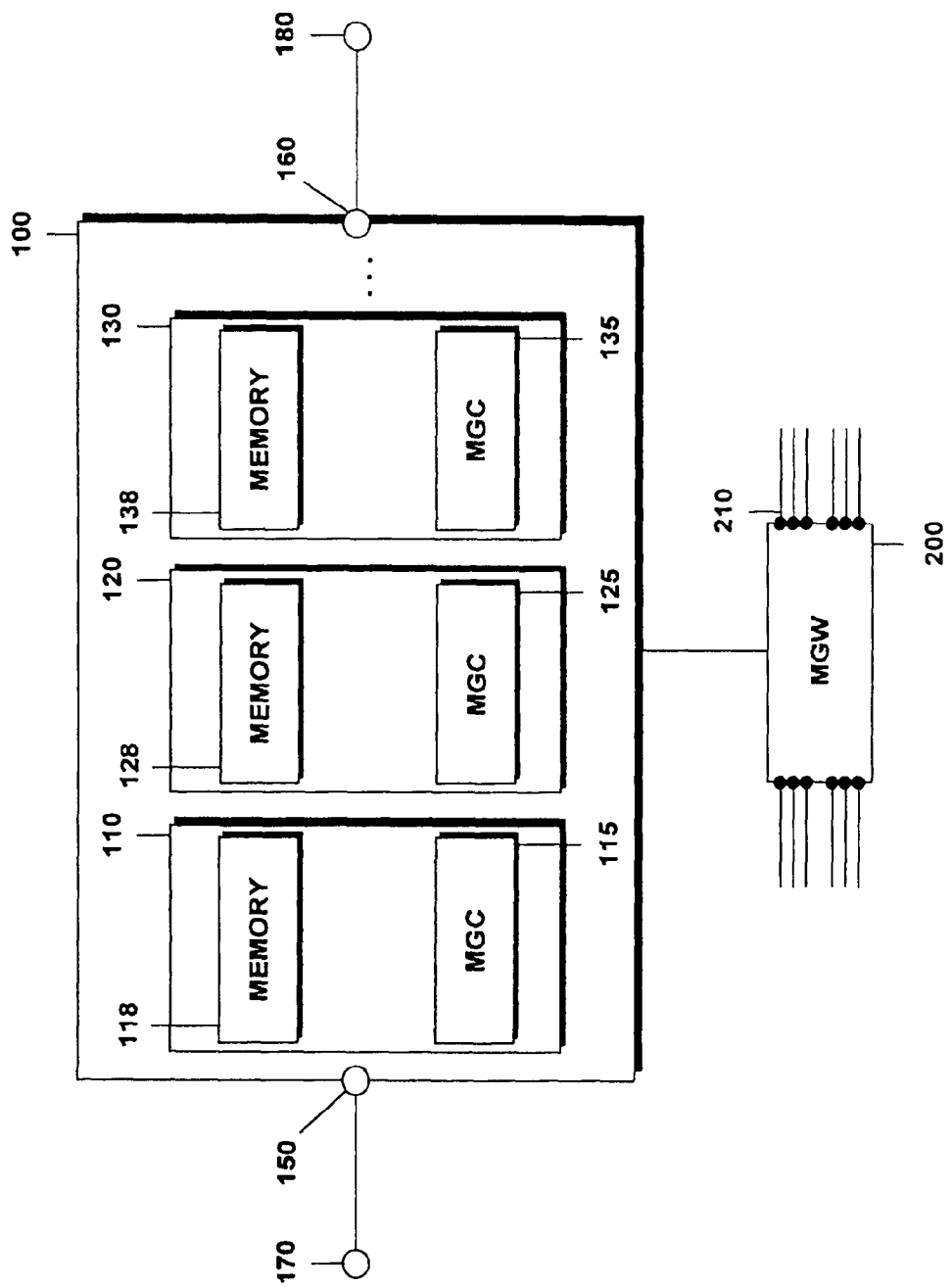
FIG. 1 shows a schematic view of a mobile switching center with a blade cluster structure allowing fast recovery of terminations after a blade failure.

In FIG. 1, a mobile switching center is shown making it possible to connect circuit switched calls. The mobile switching center contains as functional entities a mobile switching center server (MSC server) 100 and one or mode media gateway(s) 200, each MSC server 100 comprising an input 150 and an output 160 for connecting external nodes 170 and 180 together. For ease of reading and without limiting the invention, in the following description only a single media gateway 200 will be referenced. The mobile switching center sets up and releases end to end connections, handles mobility and handover requirements during a call and takes care of charging and accounting. The mobile switching center has a blade cluster structure with a plurality of blades such as the blades 110, 120, 130. For handling calls, the mobile switching center server is connected to one or more media gateway(s) 200, each media gateway comprising a plurality of terminations 210. The terminations are controlled by the MSC server 100. A termination is controlled by a single blade within the MSC server 100 during a call, call set-up and call release (e.g. blade 120). The media gateway acts as translation unit between separate telecommunication networks and gateways enables multimedia communications over multiple transport protocols. In the embodiment shown the blade 120 comprises a media gateway controller 125 that is controlling the resources such as terminations of the media gateway 200. In addition to the controller 125 a memory 128 may be provided.

Obviously any other blade provides for respective functionality, i.e. blade 110 comprises a media gateway controller 115 and blade 130 comprises a media gateway controller 135 that also may control the resources such as terminations of the media gateway 200. In addition to the controllers 115, 135 a respective memory 118,138 may be provided. In case of a blade failure, e.g. when a blade carries out a recovery procedure, the terminations 210 controlled by the failing blade should be made available to other blades for controlling a call. This is one situation where an effective release of a termination is advantageous and in the following an embodiment of an effective release method will be discussed in more detail.

Figure 2:
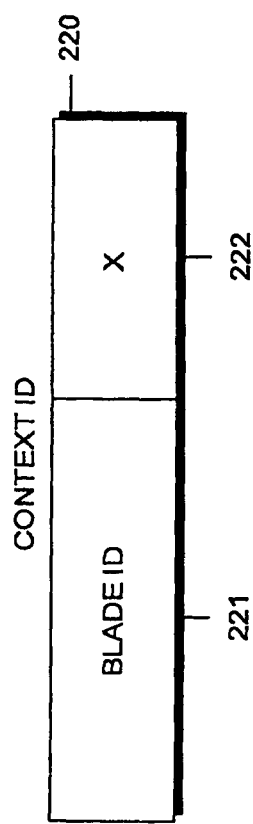
FIG. 2 shows the general structure of a context ID including a blade ID.

A termination may be added to a context for a call where two or more terminations are connected together. In the 3GPP specifications, termination name conversion is specified. By way of example with ASN.1 coding four octets (32 bits) shall be used for the termination ID, the termination ID comprising the termination type bits with a length of three bits and with the following 29 bits having a usage depending on termination type. These 29 bits may now be used for introducing the blade identification together with the use of the wildcarding mechanism. In FIG. 2, the context ID 220 used for identifying a context is shown. The context ID comprises a blade ID 221 and the remaining wildcard field 222, indicated as X in the embodiment shown in FIG. 2. Accordingly, the value of the context ID 220 shall be defined with both the blade ID and the remaining wildcard field. In a media gateway control protocol H.248 that is used for controlling the media gateway by the media gateway controller the latter instructs the media gateway to connect two or more streams. In the H.248, the blade ID may have a length of 6 bits, e.g. with values of 0 to 63 which is the center's blade ID in the MSC server 100. The remaining wildcard field X may have a length of 26 bits with unspecified usage, the media gateway deciding the value.

In the following, a first solution for context generating messages and termination subtracting messages concerning all contexts controlled by a failed blade is discussed. In case a context is to be created, the MSC server sends an ADD.request or MOVE.request to the media gateway 200, the context ID containing the wildcard context ID as shown in the following example.

```
ActionRequest ::={
   contextId: = {
      wildcard: wildcard ::= {
         '59'H (Wildcarding Position: 25)
      } (=CHOOSE)
      id: '20000000'H (For blade ID=8)
   }
}
......
```

The above proposal for a context generating message uses the wildcard mechanism forcing the media gateway to choose a context ID that has the identification of the controlling blade 8 included in the upper six bits. In the embodiment shown the hexadecimal notation is used, the ID "20000000'H" containing the number 8 at bit positions 26 to 31. The information CHOOSE in the example indicates that the media gateway can freely select the wildcarded bits 0 to 25.

In case there is a blade failure in the MSC server, e.g. at outage of a blade with loss of calls controlled by that blade, another blade will send a single subtract message for the context used by the failed blade before. Accordingly, a termination subtracting message will be sent applicable to all contexts matching the context identifier, the context identifier including the blade identifier. This is shown by the following example.

```
Subtract with partial wildcard
ActionRequest ::= {
      contextId: wildcard: wildcard ::= {
         'D9'H (Wildcarding Position: 25)
      } (=ALL)
         id: '20000000'H (blade ID=8)
      }
   }
   commandRequests: commandRequests ::= {
      CommandRequest ::= {
      command: SubtractRequest ::= {
   terminationID: TerminationIDList ::= {
         TerminationID ::= {
         wildcard: wildcard ::= {
            'DF'H (Wildcarding Position: 31)
         } (=ALL except ROOT)
            id: '00000000'H (no meaning)
         }
      }
   }
   ...
```

The above-mentioned example discloses that terminations of all contexts of the blade having the blade ID=8 should be subtracted.

In the following, another solution for context generating messages and termination subtracting messages concerning all contexts controlled by a failed blade is shown. The concept of this solution is the same as the one discussed above, however, the notation is different.

In the existing media gateway control protocol H.248.1 context ID wildcard only allows ALL, meaning really all contexts, or CHOOSE, the value being fully assigned by the media gateway. The solution now is to allow partial wildcard for context ID, when context is to be created in a media gateway and to use the wildcard context ID to subtract during partial recovery. Again, the value of the context ID is split into the blade ID 221 and the remaining context ID or remaining wildcard field 222, the blade ID having a length of e.g. 6 bits, the remaining wildcard field X having a length of e.g. 26 bits. The usage of these bits is unspecified, the media gateway deciding the value. The wildcard CHOOSE is defined if the context ID satisfies the following formula or in other words if the lower 26 bits matches 3FFFFFE'H.

(ContextID & 03FFFFFF'H)=03FFFFFE'H

ALL is defined if contextID satisfied the following formula, or in other words, the low 26 bits matches 3FFFFFF'H.

(ContextID & 03FFFFFF'H)=03FFFFFF'H

For preparing a recovery with a termination subtracting message applicable to all contexts matching the context identifier, the MSC server sends an ADD.request or MOV.request to the media gateway. The context ID on action shall contain the wildcard context ID as shown in the following proposition

```
ActionRequest ::= {
   ContextId: = '23FFFFFE'H (CHOOSE, For
Blade ID=8)
   ......
```

By this way, the context IDs can be grouped by blade IDs as some leading bits can specify the blade ID. In case of a blade recovery, a single subtract message for all contexts used by the failed blade is sent as shown in the following example.

```
Subtract with partial wildcard
ActionRequest ::= {
      contextId: '23FFFFFF'H (CHOOSE, For
   blade ID=8)
      commandRequests: commandRequests ::= {
         CommandRequest ::= {
         command: SubtractRequest ::= {
   terminationID: TerminationIDList ::= {
         TerminationID ::= {
         wildcard: wildcard ::= {
            'DF'H (Wildcarding Position: 31)
            } (=ALL except ROOT)
            id: '00000000'H (no meaning)
         }
      }
   ...
```

Figure 4:
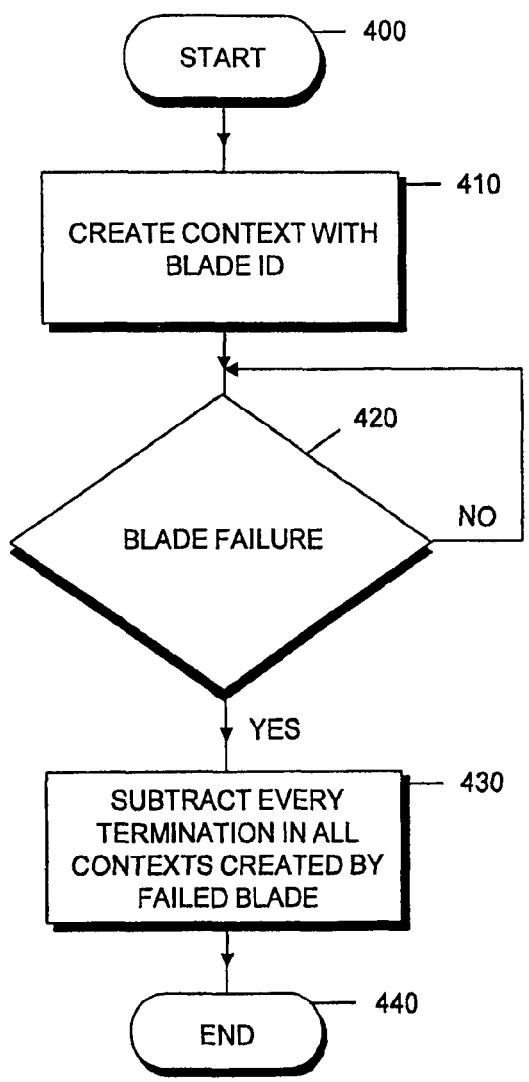
FIG. 4 shows a flowchart comprising the steps for subtracting terminations applicable to all contexts created by a failed blade.

As in the other example above one message is enough to address all terminations relating to a context controlled by a failed blade. The steps for a fast recovery using two messages is summarized in FIG. 4. After starting the method in step 400 a context generating message is created containing the blade ID in step 410. In step 420 it is asked whether a blade failure has occurred. In the affirmative, a termination subtract message is generated subtracting every termination in all contexts that were created by the failed blade (step 430). As can be seen in FIG. 4 with one message, the message sent in step 430, a fast recovery can be obtained. The method ends in step 440.

Figure 3:
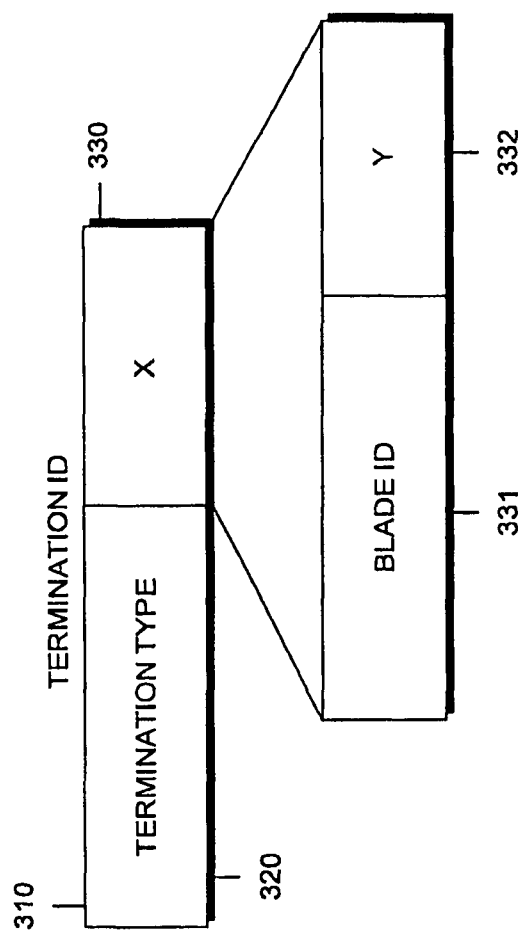
FIG. 3 shows the general structure of a termination ID including a blade ID.
Figure 5:
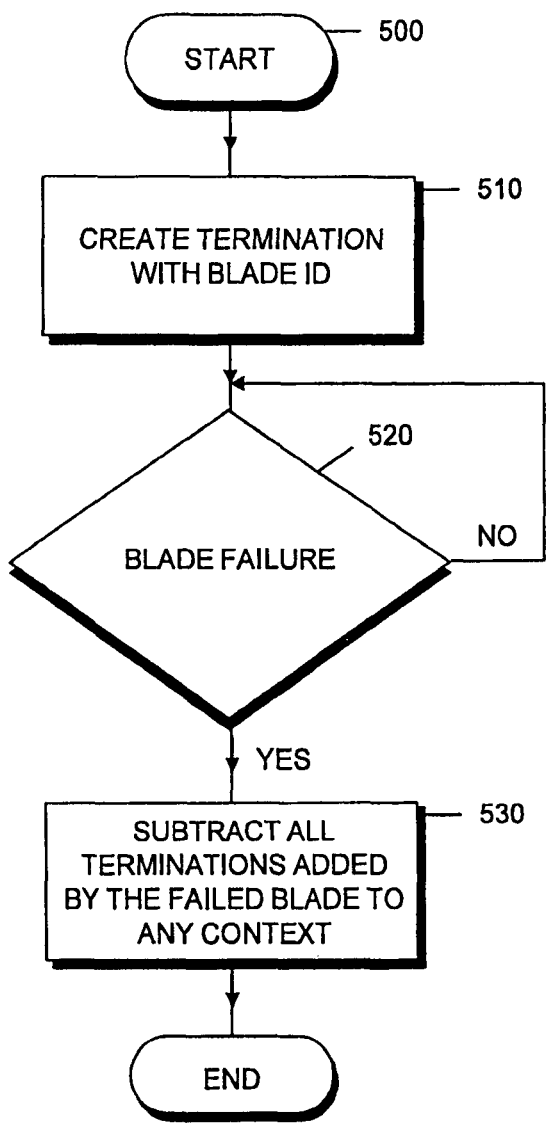
FIG. 5 shows a flowchart comprising the steps for subtracting all terminations controlled by a failed blade.

In FIGS. 3 and 5, another embodiment of the invention is shown. In FIG. 3 a termination ID 320 is shown in further detail. In the 3GPP specifications, four octets corresponding to 32 bits are used. The first part of the termination ID is the termination type 310 followed by the wildcard X 330, having a length of 29 bits. The usage of the wildcard field 330 depends on termination type.

The H.248 media gateway control protocol provides a possibility to use wildcard of termination ID, the wildcard being either CHOOSE or ALL. According to this embodiment of the invention, the wildcard is now used to introduce the blade ID 331 followed by the remaining wildcard field 332, the blade ID having a length of 6 bits followed by the remaining wildcard field having a length of 23 bits.

In the flowchart shown in FIG. 5, the fast recovery in case of a blade failure is shown. After the start in step 500 a termination addition message is created in step 510 including the blade identifier. When a termination is to be created, the MSC server sends an ADD.request message to the media gateway. For ephemeral terminations, termination ID wildcard CHOOSE shall allow blade ID specified in the wildcard field as shown in the following example:

```
commandRequests: commandRequests ::= {
    CommandRequest ::= {
    command: AddRequest ::= {
    terminationID: TerminationIDList ::= {
        TerminationID ::= {
        wildcard: wildcard ::= {
            '56'H (Wildcarding Position: 22)
        } (=CHOOSE ATM/IP)
        id: '24000000'H (For blade ID=8)
        }
    }
}
......
```

By this way, the termination IDs can be grouped by blade ID as some leading bits can specify the blade ID. In the above example, it is specified that the added terminations are controlled by blade having the ID 8. In step 520, it is asked whether a blade failure occurs and if this is the case, by way of example, if there is a single blade large restart another blade can send a single subtract message for the ephemeral terminations that the failed blade used before in step 530. Accordingly, a termination subtracting message including the termination identifier is sent including the blade ID as is shown in the following example:

```
Subtract with partial wildcard
commandRequests: commandRequests ::= {
    CommandRequest ::= {
    command: SubtractRequest ::= {
    terminationID: TerminationIDList ::= {
        TerminationID ::= {
        wildcard: wildcard ::= {
            'D6'H (Wildcarding Position: 28)
        } (=ALL ATM/IP)
        id: '24000000'H (For blade ID=8)
        }
    }
}
...
```

Figure 6:
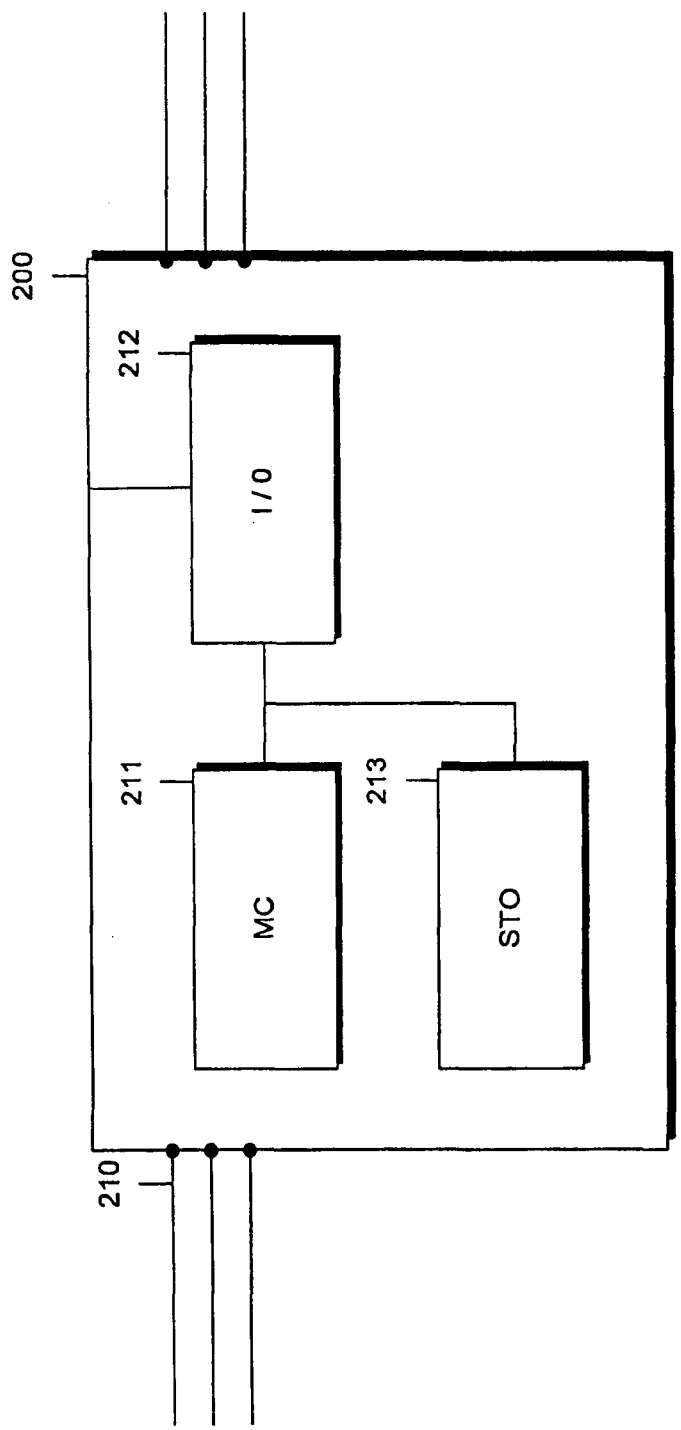
FIG. 6 shows a schematic view of a media gateway

In FIG. 6, a schematic view of a media gateway is shown that enables communication between separate networks. The media gateway 200 transfers call related data from an external node to another external node via the terminations 210. The media gateway comprises a control unit 211 for executing and controlling commands received from the mobile switching center. Commands are received in the media gateway 200 and are transmitted from the media gateways via an input/output unit 212. Furthermore, a storage unit 213 is provided for storing the information necessary for a proper functioning of the media gateway 200.

Summarizing, the invention allows a fast recovery procedure between a blade cluster MSC server and the media gateway. In the case of wildcarded messages relating to all contexts used by a certain blade, all terminations included in these contexts, such as ephemeral and TDM terminations, are released a short time after the blade recovery. Individual recovery message for each termination is not necessary. With the use of partially wildcarded termination subtracting message, relating to all terminations used by a certain blade, ephemeral terminations in the media gateway can be released a short time after a blade recovery in the MSC server. In both cases, the signalling between the MSC server and the media gateway is minimized as only one message is necessary for releasing the terminations.

Although described with respect to H.248, it is understood that H.248 serves as an exemplary Control Protocol not excluding any other suitable control protocol.

The invention claimed is:

1. A method implemented by a switching center for controlling a media gateway, the switching center having a blade cluster structure with a plurality of blades, the method comprising transmitting to the media gateway a message that includes wildcard information, the wildcard information containing a blade identifier and a remaining wildcard field, the blade identifier identifying one of the plurality of blades that form the blade cluster structure of the switching center.

2. The method according to claim 1, wherein the blade identifier is contained in bits that have predefined positions within the wildcard information.

3. The method according to claim 1, wherein the message is a context generating message that includes a context identifier as the wildcard information, the context identifier thereby containing the blade identifier and the remaining wildcard field.

4. The method according to claim 1, wherein the message is a termination subtracting message applicable to all contexts matching a context identifier, the context identifier included within the termination subtracting message as the wildcard information and thereby containing the blade identifier and the remaining wildcard field.

5. The method according to claim 4, further comprising determining whether one blade of the blade cluster has failed, and wherein transmitting the termination subtracting message to the media gateway comprises transmitting the message to direct the media gateway to subtract terminations of all contexts controlled by the failed blade, wherein the contexts controlled by said failed blade are identified by the blade identifier contained in the termination subtracting message.

6. The method according to claim 1, wherein the message is a termination addition message including a termination identifier as the wildcard information, the termination identifier thereby containing the blade identifier and the remaining wildcard field.

7. The method according to claim 1, wherein the message is a termination subtracting message including a termination identifier, the termination identifier containing the blade identifier.

8. The method according to claim 7, further comprising determining whether one blade of the blade cluster has failed, and wherein transmitting the termination subtracting message to the media gateway comprises transmitting the message to direct the media gateway to subtract terminations controlled by the failed blade, wherein the terminations controlled by the failed blade are identified by the blade identifier contained in the termination subtracting message.

9. The method according to claim 1, wherein the blade identifier identifies the blade of the blade cluster that is controlling a communication path to which said message relates to.

10. A media gateway controller associated with a switching center server that has a blade cluster structure with a plurality of blades, the media gateway controller comprising:

a processor and a memory, said memory containing instructions executable by said processor whereby said media gateway controller is configured to control a media gateway by generating a message for the media gateway that includes wildcard information, the wildcard information containing a blade identifier identifying one of said plurality of blades that form the blade cluster structure of the switching center server.

11. The media gateway controller according to claim 10, wherein the media gateway controller is configured to generate a context generating message for creating a context of a communication path, the context generating message including a context identifier as the wildcard information, the context identifier thereby containing the blade identifier as well as a remaining wildcard field.

12. The media gateway controller according to claim 11, further configured to generate a termination subtracting message for subtracting terminations of all contexts that were generated with a context generating message that included said blade identifier, the termination subtracting message including a context identifier as wildcard information, the context identifier including the blade identifier.

13. The media gateway controller according to claim 10, wherein the media gateway controller is configured to generate a termination creating message including a termination identifier as the wildcard information, the termination identifier thereby containing the blade identifier as well as a remaining wildcard field.

14. The media gateway controller according to claim 10, wherein the media gateway controller is configured to generate a termination subtracting message for subtracting a termination that was generated with a termination generating message that included said blade identifier, the termination subtracting message including a termination identifier as the wildcard information, the termination identifier thereby containing the blade identifier.

15. The media gateway controller according claim 10, wherein in case of a blade failure of one of the blades of the blade cluster, the media gateway controller is configured to transmit to the media gateway a termination subtracting message that identifies the terminations controlled by the failed blade to the media gateway, for subtraction by the media gateway.

16. A method implemented by a media gateway controlled by a switching center, the switching center having a blade cluster structure with a plurality of blades, the method comprising:

receiving from the switching center a message that includes wildcard information;

determining a blade identifier contained within the wildcard information, the wildcard information containing the blade identifier and a remaining wildcard field, the blade identifier identifying a particular one of said blades that form the blade cluster structure of the switching center; and executing one or more commands according to the message, based on the blade identifier.

17. The method according to claim 16, wherein said executing comprises subtracting terminations of the media gateway that have been added to any context controlled by the particular blade identified by said blade identifier.

18. A media gateway configured to be controlled by a switching center, the switching center having a blade cluster structure with a plurality of blades, the media gateway comprising:

an input/output circuit configured to receive from the switching center a message that includes wildcard information;

a control circuit configured to:

determine a blade identifier contained within the wildcard information, the wildcard information containing the blade identifier and a remaining wildcard field, the blade identifier identifying a particular one of said blades that form the blade cluster structure of the switching center; and execute one or more commands according to the message, based on the blade identifier.

19. The media gateway according to claim 18, wherein the control circuit is configured to execute the one or more commands by subtracting terminations of the media gateway that have been added to any context controlled by the particular blade identified by said blade identifier.

* * * * *